(12) United States Patent
Mueller et al.

(10) Patent No.: US 10,655,754 B2
(45) Date of Patent: May 19, 2020

(54) METHOD FOR OPERATING A DIAPHRAGM VALVE, SYSTEM AND READING DEVICE

(71) Applicant: GEMÜ GEBR. MÜLLER APPARATEBAU GMBH & CO., KOMMANDITGESELLSCHAFT, Ingelfingen (DE)

(72) Inventors: Gert Mueller, Kuenzelsau (DE); Joachim Brien, Boehmenkirch (DE); Werner Floegel, Doerzbach (DE)

(73) Assignee: GEMÜ GEBR. MÜLLER APPARATEBAU GMBH & CO., KOMMANDITGESELLSCHAFT, Ingelfingen (DE)

(*) Notice: Subject to any disclaimer, the term of this patent is extended or adjusted under 35 U.S.C. 154(b) by 65 days.

(21) Appl. No.: 15/579,275

(22) PCT Filed: May 17, 2016

(86) PCT No.: PCT/EP2016/060975
§ 371 (c)(1),
(2) Date: Dec. 4, 2017

(87) PCT Pub. No.: WO2016/192970
PCT Pub. Date: Dec. 8, 2016

(65) Prior Publication Data
US 2018/0163895 A1 Jun. 14, 2018

(30) Foreign Application Priority Data
Jun. 2, 2015 (DE) .................. 10 2015 210 204

(51) Int. Cl.
*F16K 37/00* (2006.01)
*F16K 7/12* (2006.01)
(Continued)

(52) U.S. Cl.
CPC ............ *F16K 37/0041* (2013.01); *F16K 7/12* (2013.01); *F16K 37/0083* (2013.01); *F16J 3/02* (2013.01); *G06K 19/0723* (2013.01)

(58) Field of Classification Search
None
See application file for complete search history.

(56) References Cited

U.S. PATENT DOCUMENTS 6,026,352 A * 2/2000 Burns ................ G05B 19/0425
702/182
6,441,744 B1 * 8/2002 Adams .................... G01F 1/363
340/626

(Continued)

FOREIGN PATENT DOCUMENTS

| CN | 102052499 A | 5/2011 |
|---|---|---|
| CN | 104049628 A | 9/2014 |
| DE | 102013214304 A1 | 1/2015 |

OTHER PUBLICATIONS

English Translation of Chinese Office Action dated Dec. 17, 2018 for Application 201680032265.7, Filed May 17, 2016, pp. 1-10.

(Continued)

*Primary Examiner* — K. Wong
(74) *Attorney, Agent, or Firm* — Bond Schoeneck & King, PLLC; George McGuire

(57) ABSTRACT

A method for operating a diaphragm valve including the step of reading out data, which characterize at least one property of a diaphragm of the diaphragm valve, from at least one data memory integrated into the diaphragm valve, by a reading device. The method further includes the steps of: (a) transmitting the read-out data to a processing device which is arranged remote from the reading device and the diaphragm valve and (b) synchronizing the transmitted data with data present in the processing device.

17 Claims, 3 Drawing Sheets

(51) Int. Cl.
*F16J 3/02* (2006.01)
*G06K 19/07* (2006.01)

(56) References Cited

U.S. PATENT DOCUMENTS

| | | | |
|---|---|---|---|
| 6,824,116 B1 | 11/2004 | Woo et al. | |
| 8,201,572 B2* | 6/2012 | Segal | E03B 7/071 |
| | | | 137/15.11 |
| 9,857,803 B1* | 1/2018 | Abuda | E03B 7/04 |
| 9,857,805 B2* | 1/2018 | Halimi | G05D 16/20 |
| 2003/0001590 A1 | 1/2003 | Mengle | |
| 2005/0092079 A1 | 5/2005 | Ales et al. | |
| 2008/0202606 A1 | 10/2008 | O'Hara et al. | |
| 2014/0130878 A1* | 5/2014 | Marinez | F16K 37/005 |
| | | | 137/2 |
| 2015/0130593 A1 | 5/2015 | Mats et al. | |

OTHER PUBLICATIONS

P E T Processing Equipment Tracking—RFID Tracking and Lifecycle Analysis System; http://web.archive.org/web/20141123111042;/ http://www.verigenics.com/process-equi . . . Jul. 21, 2016.
International Search Report and Written Opiniion Form PCT/ISA/210, Written Opinion PCT/ISA/237, International Application No. PCT/EP2016/060975 pp. 1-8, International Filing Date May 17, 2016, dated Oct. 4, 2016.
WO2016192970-ISR-069—PCT/ISA/210, dated Oct. 4, 2016.

* cited by examiner

METHOD FOR OPERATING A DIAPHRAGM VALVE, SYSTEM AND READING DEVICE

CROSS-REFERENCE TO RELATED APPLICATIONS

This application is the United States National Stage entry under 35 U.S.C. 371 of PCT/EP2016/060975, filed May 17, 2016, which claims priority to German application serial number 102015210204.1, filed Jun. 2, 2015, the entire disclosure of each of which is incorporated herein by reference.

BACKGROUND

The invention relates to a method for operating a diaphragm valve. A system and a reading device are also subjects of the present invention.

DE 10 2013 214 304 A1 describes a diaphragm valve comprising a diaphragm on which a data carrier in the form of an RFID chip is provided. As a result, not only can data relating to the materials, dimensions, production and similar key variables of the diaphragm be stored on the data carrier and/or digitally referenced in the system, but also data relating to the relevant client, delivery, etc. All said data can be adjusted to the relevant individual diaphragm and stored on the associated data carrier thereof.

Proceeding from this, the object of the present invention is to provide a method for operating a diaphragm valve which increases operational safety and reduces operational costs.

SUMMARY OF THE INVENTION

This object is achieved by a method and by a system, which comprises, inter alia, a diaphragm valve and a reading device, and a reading device. Furthermore, features that are important to the invention can be found in the following description and in the accompanying drawings, it being possible for said features to be important to the invention in isolation and in a wide variety of combinations without this being explicitly mentioned again.

According to the invention, the identification of a complete valve structure, i.e. an entire component, is made possible by means of the read-out data. The corresponding data do not have to be held locally at the diaphragm valve. Rather, only some of the data are present in the data memory integrated into the diaphragm valve, while other data are present in the processing device which is arranged remote from said valve.

The data present in the integrated data memory of the diaphragm valve are, when required, read-out and held and transmitted to the processing device which is arranged remote from the reading device and the diaphragm valve and synchronized with the data present on said processing device as required. "Synchronize" means that the data for a particular diaphragm valve, which are present at least initially in different places, are merged or linked together to form a coherent dataset. Because the data are present in different places, data security is significantly increased. The entirety of the data may be such that it makes it possible to characterize the diaphragm valve and all subcomponents of the diaphragm valve in a comprehensive manner. A type of "electronic identity" of the diaphragm valve is thus made possible, all the data of said electronic identity being linked together and/or synchronized in the manner of a mosaic only by the remote processing device.

It is clear that the method according to the invention is, in principle, not only suitable for operating a diaphragm valve, but is advantageous in the operation of any type of valve or electrical equipment or other devices for controlling valves.

In an alternative variant of the method that is of particular interest to the operator of the diaphragm valve in terms of data security, only the data memory (and not necessarily the processing device) is arranged remote from the reading device and the diaphragm valve, and after the data have been read out from the data memory integrated into the diaphragm valve, the data are transmitted from the remote data memory to the reading device and linked to or synchronized with the data read out from the integrated data memory, and if necessary also processed at said reading device.

In a first development, it is proposed, in step a, for the data to be transmitted to a processing device at the premises of the manufacturer or supplier of the diaphragm valve. The processing device is therefore not only remote from the reading device and the diaphragm valve, but also remote from the operator of the diaphragm valve. This again increases data security. Furthermore, costs for the operator of the diaphragm valve are hereby reduced as well, since the manufacturer or supplier of the diaphragm valve already has access to data which relate to the diaphragm valve, and therefore said data do not have to be held at the premises of the operator.

Furthermore, it is proposed for the data to be read out by means of a mobile reading device, in particular by means of a smartphone or a tablet PC/smart tablet. This simplifies execution of the method according to the invention. The same applies to the embodiment of the method in which the data are read out wirelessly.

A further development of the method according to the invention is distinguished in that the data present in the processing device characterize at least one property of the diaphragm of the diaphragm valve and/or at least one property of a component of the diaphragm valve that is not the diaphragm, and/or at least one property of the diaphragm valve. Therefore, practically all essential parameters that are required for forming an electronic identity can be provided remotely from the reading device and the diaphragm valve.

It is also particularly advantageous, but obviously optional, for data which characterize at least one property of a component that is not the diaphragm and/or one operational property of the diaphragm valve to be read out from the integrated data memory. Therefore, the range of the data that are directly stored at or in the diaphragm valve is greatly extended. In particular data which characterize an operational property of the diaphragm valve may however be confidential, since said data at least partially describe the method process carried out at the premises of the operator of the diaphragm valve. Because precisely said data are present in the diaphragm valve, it is ensured that said data are not unintentionally made accessible to third parties. In principle, it is also possible, however, for said data to be stored remotely from the diaphragm valve, for example in the processing device.

The above-mentioned data may comprise at least one item of data from the following group: type, material, valve drive, manufacture date, manufacture location, production batch, quality test values, supplier, delivery route, storage location, storage duration, date into storage, date out of storage, installation date, installation location, name of installer, and name of operator. Quality test values may, for example, include such variables which are recorded during and/or after manufacture of the diaphragm and/or other components of the diaphragm valve for quality assurance, specifically, for example, measured tolerances, surface roughness, dimensions, etc.

Data which characterize an operational property of the diaphragm valve may comprise an item of data from the following group: fluid type, fluid pressure, fluid temperature, number of switching cycles, operating time, switching frequency, etc. These are essential parameters which characterize the service life of the diaphragm valve and/or components thereof and which therefore allow for an accurate representation of the current state of the diaphragm valve and/or the diaphragm and/or other subcomponents of the diaphragm valve.

It is particularly advantageous for the current diaphragm thickness to be determined at the time of an initialization of a diaphragm drive and preferably, together with the date said thickness was determined, to be stored in the integrated data memory and/or transmitted to the processing device (e.g. for storage thereon). Therefore, a central data item which characterizes a property of the diaphragm valve is continuously generated at each initialization, as a result of which the entirety of the data characterize a state of the diaphragm valve in a particularly up-to-date manner.

Furthermore, it is proposed, during maintenance of the diaphragm valve, for at least one variable which characterizes the current state of the diaphragm to be determined and stored in the data memory and/or transmitted to the processing device. Said variable may, for example, be determined or deduced by a person carrying out the maintenance using objective criteria, i.e. for example using measurements, or using subjective criteria, i.e. for example a visual inspection. This also completes and optimizes the overall picture which is formed from the entirety of the available data relating to the state of the diaphragm valve.

A particularly preferred development of the method according to the invention is distinguished in that it further comprises the following steps:

c. processing the synchronized data in the processing device;
d. determining an action by means of the processing device depending on the result of the processing.

The functionality of the method according to the invention is hereby extended, by an action being automatically triggered based on the result of the processing of the total data consisting of the transmitted data and the data present in the processing device.

The processing device may, for example, determine a probable state of wear, in particular of the diaphragm, in step c. This significantly improves the operational reliability of the diaphragm valve.

The action in step d may comprise at least one action from the following group: automatic creation and/or transmission of status information and/or a replacement part request and/or warning information. This again improves the operational reliability of the diaphragm valve and of the installation in which the diaphragm valve is installed, and optionally, interruptions to operation, which are necessary for maintenance and/or repair of the diaphragm valve, are reduced to a minimum, both in terms of the number of said interruptions and in terms of the duration thereof.

It is possible to transmit the status information and/or warning information to the reading device and to display said information thereon. The operator on-site, i.e. at the diaphragm valve, thus immediately obtains a comprehensive overview, such that they can, if necessary, implement further measures which increase the operational reliability of the diaphragm valve and of the installation in which the diaphragm valve is installed. The status information may for example relate to a probable remaining service life of the diaphragm valve or diaphragm, and/or the warning information may indicate imminent valve failure.

In summary, it can therefore be stated that the present invention allows for the information required for efficient quality assurance and maintenance to be generated in a rapid, secure and up-to-date manner. The data characterizing an operational property of the diaphragm valve may, for example, be stored on the integrated memory, whereas data characterizing variables generated during manufacture of the diaphragm or diaphragm valve are stored in the processing device remote from the diaphragm valve. By means of the entirety of the data, the operator of the diaphragm valve is easily able to track the service life of the diaphragm valve and the components thereof without said operator having to be in possession of all the data, and without sensitive data which characterize the operation of the diaphragm valve being unintentionally leaked.

This is achieved by the data stored at the diaphragm valve being synchronized with the data present in the external processing device only by means of said processing device. The invention thus establishes a connection between the data present at the premises of the operator or user of the diaphragm valve and the data present at the premises of the manufacturer and/or supplier of the diaphragm valve.

BRIEF DESCRIPTION OF THE DRAWINGS

In the following, an embodiment of the present invention will be described by way of example with reference to the accompanying drawings, in which.

DETAILED DESCRIPTION

Figure 1:
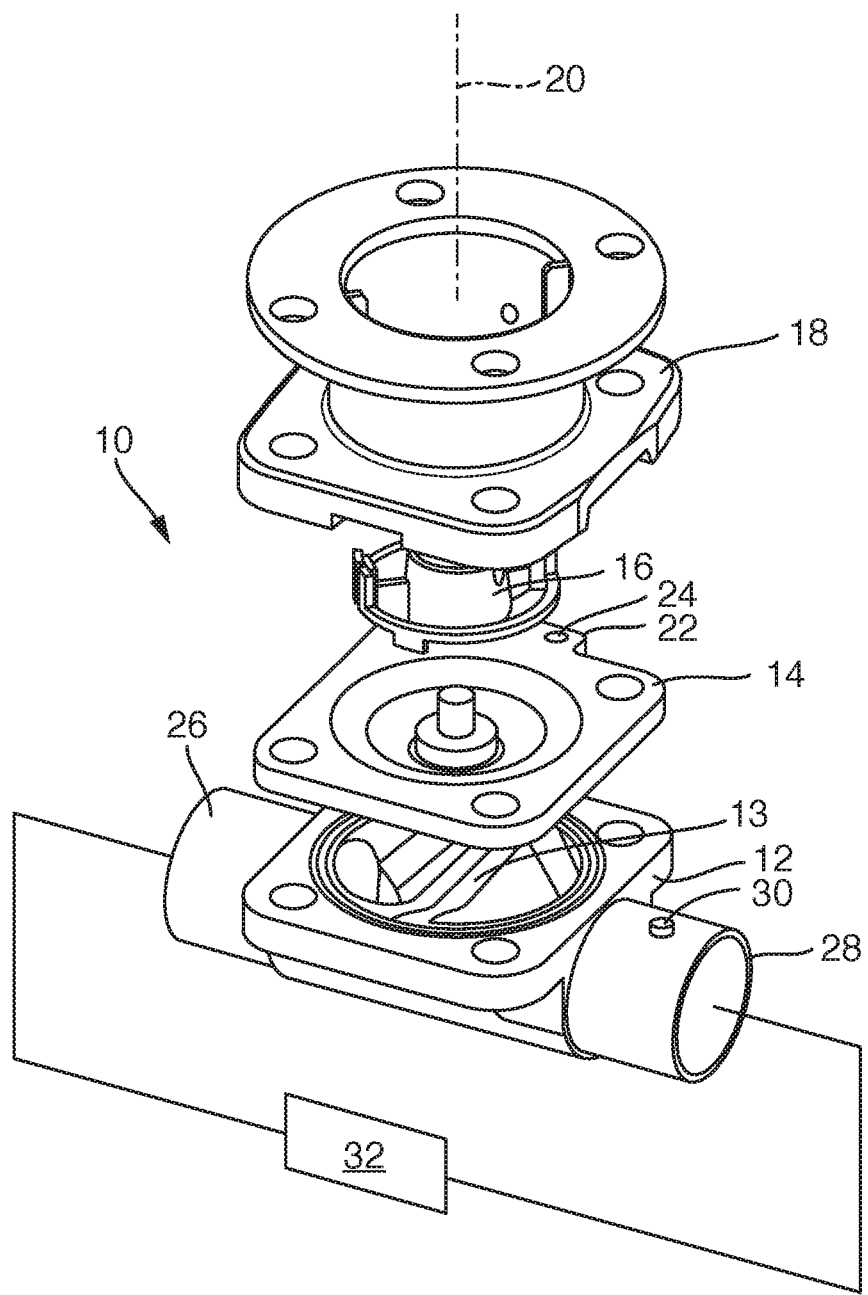
FIG. 1 is an exploded perspective view of a diaphragm valve comprising a diaphragm and two data memories, and shows, symbolically, a process installation in which the diaphragm valve is installed.

In FIG. 1, a diaphragm valve is overall denoted by reference sign 10. Said valve comprises a valve body 12 having a seat geometry 13, a diaphragm 14, a pressure element 16 and an intermediate element 18. The diaphragm 14 is clamped between the valve body 12 and the intermediate element 18. The pressure element 16 is used to connect the diaphragm 14 to a valve drive 20, which is merely indicated by a dot-dash line in FIG. 1, and is also used for the form-fitting sealing function.

A tab 22 is provided on the edge of the diaphragm 14 to the rear in FIG. 1, into which tab a data memory 24 in the form of an RFID chip is integrated. The valve body 12 comprises an inlet port 26 and an outlet port 28. A data memory 30 in the form of an RFID chip is also arranged on the outlet port 28. In an embodiment not shown here, data memories are also provided on the valve body and/or on the inlet port. The valve bodies may, for example, differ in terms of the seat geometry. In this case, each valve body may comprise a data memory that is assigned to the specific seat geometry.

The diaphragm valve 10 is installed in a process installation 32, which is indicated merely symbolically by a sketched box 32 in the present case. The process installation may for example be an installation used in the pharmaceutical industry for preparing medication.

Figure 2:
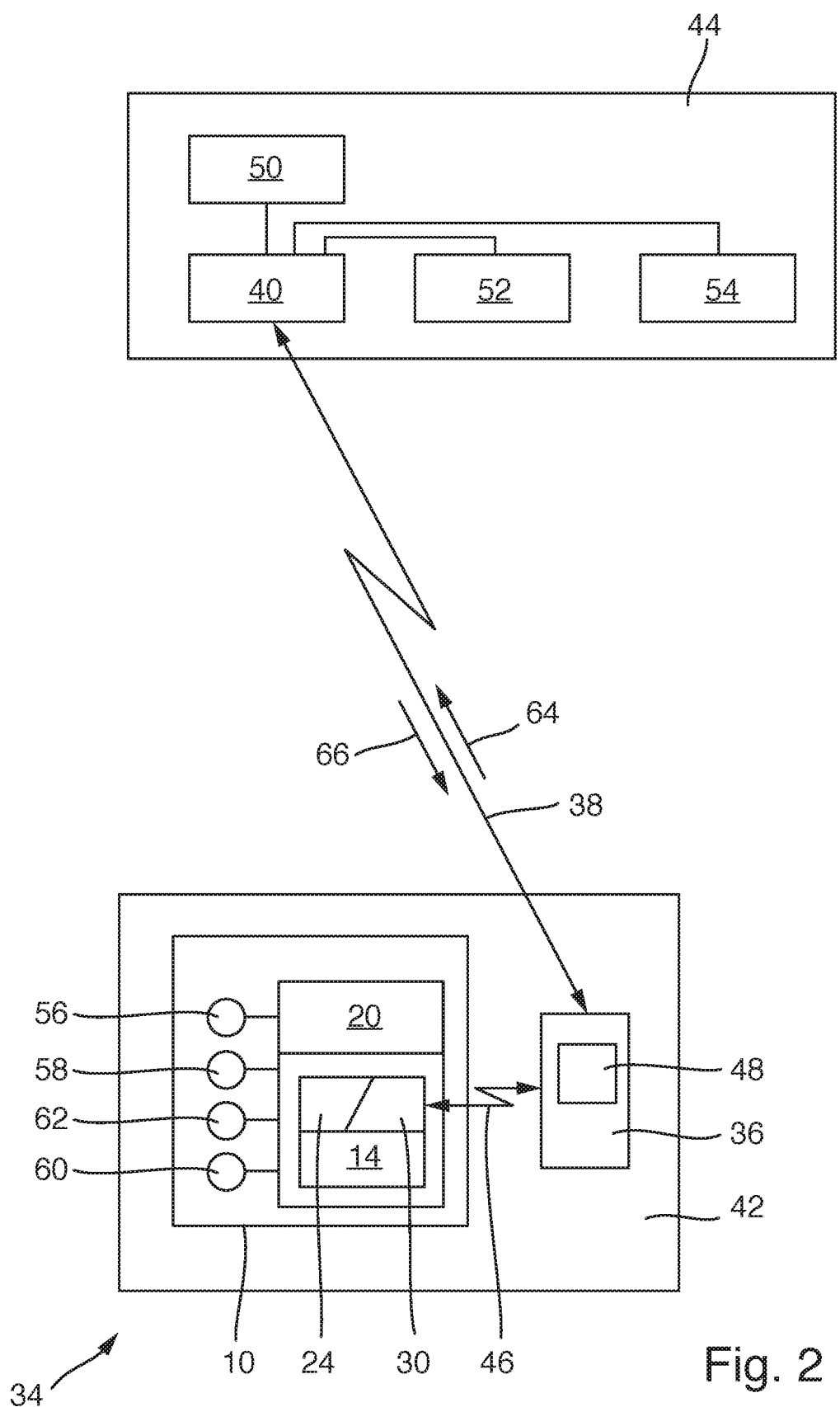
FIG. 2 is a schematic view of a system comprising the diaphragm valve, a reading device, a transmission device and a processing device.

In FIG. 2, a system, which, inter alia, also comprises the diaphragm valve 10 from FIG. 1, is overall denoted by reference sign 34. The system 34 further comprises a reading device 36 for reading out data stored in the data memory 24 and the data memory 30, a transmission device 38 for transmitting the read-out data to a processing device 40, which is arranged remote from the reading device 36 and the diaphragm valve 10 and which is also part of the system 34. The data memory 24, the data memory 30, the reading device 36, the transmission device 38 and the processing device 40 are designed and programmed to carry out a method which will be described in detail below.

As can be seen in FIG. 2, the diaphragm valve 10 and the reading device 36 are arranged at the premises of a company 42 that operates the process installation 32. The processing device 40, on the other hand, is arranged at the premises of a manufacturer 44 (or at least a supplier) of the diaphragm valve 10. However, in principle, said processing device may also be arranged at the premises of another service provider.

The reading device 36 is designed and programmed to read out data from the RFID chips 24 and 30 wirelessly, which is indicated by an arrow 46. Said reading device has a display 48, which can be used to display read-out data but also to display commands or data which are intended to be transmitted from the reading device 36 to one of the RFID chips 24 and 30 or to both RFID chips 24 and 30. In the embodiment shown here, the reading device 36 is thus not only designed and programmed to read out data, but also to transmit data to the RFID chips 24 and 30 such that said data can be stored on said chips.

The reading device 36 may be a specific apparatus which is exclusively provided for use in conjunction with the diaphragm valve 10. In this case, the display 48 may simply be an LED display. However, it is also possible for the reading device 36 to be a commercially available smartphone or a commercially available tablet PC or smart tablet, and for the display 48 to be the display of the smartphone. NFC technology, for example, or another form of wireless technology may be used for the data communication between the RFID chips 24 and 30 and the reading device 36, and the conventional interfaces required for this purpose that allow data communication of this kind may be used.

At the processing device 40 at the premises of the manufacturer 44 of the diaphragm valve 10, there is another data memory 50, which is coupled to the processing device 40. Furthermore, specific action modules are connected to the processing device 40, of which two are shown in FIG. 2 by way of example, specifically an action module 52, by means of which an automatic replacement part request can be generated, and an action module 54, by means of which an automatic maintenance request can be generated. Other action modules (not shown), which are connected to the processing device 40, may be used to automatically generate status information relating to the diaphragm valve 10 and/or to automatically generate warning information, also relating to the diaphragm valve 10.

The data which is stored in the data memory 50 at the processing device 40 are preferably those generated during manufacture of the diaphragm valve 10. Said data may relate to the diaphragm 14, a component other than the diaphragm 14, or the diaphragm valve 10 as a whole. The stored data may characterize any property, for example the type of the diaphragm valve 10, the type of the diaphragm 14, the type of the valve drive 20, the material of the valve body 12, the material of the diaphragm 14, the manufacture date of the valve body 12, the manufacture date of the diaphragm 14, the manufacture date of the valve drive 20, the assembly date of the valve body 12, diaphragm 14, pressure element 16, intermediate element 18 and valve drive 20, the manufacture location of the subcomponents or of the entire diaphragm valve 10, the production batch, for example of the diaphragm 14, specific quality test values such as tolerances, surface roughness, dimensions, results from visual inspections, etc.

The data stored in the processing device 40 may also include data relating to or defining a maintenance plan, a workflow in a particular operational situation or in a particular maintenance case, an error catalogue, image documentation of the diaphragm valve 10, and other similarly stored information.

Other properties which may be characterized by the stored data include the name of sub-suppliers, information relating to the delivery route, information relating to a storage location and storage duration, preferably also relating to the date into storage and the date out of storage, all of which relates both to subcomponents and to the entire diaphragm valve 10. Said properties may also include the date on which the diaphragm valve 10 was installed in the process installation 32, the name of the installer that installed the diaphragm valve 10 and the name of the operator, and similar information.

At least some of the above-mentioned data may also characterize a property of the diaphragm 14 and be stored in the integrated data memory 24 of the diaphragm 14. Furthermore, the data stored in the integrated data memory 24 of the diaphragm 14 may also characterize an operational property of the diaphragm valve 10. An operational property of this kind is, for example, the type and/or composition of the fluid that is flowing through the diaphragm valve 10 or is switched thereby, the temperature of said fluid, the number and frequency of switching cycles, the cumulative operation time, etc.

Said data may be either saved in the data memory 24 "manually" by an operator by means of the reading device 36, or recorded at least in part by sensors integrated into the diaphragm valve 10 and/or process installation 32 and automatically transmitted to the data memory 24 and stored therein. Sensors of this kind are indicated in FIG. 2 and are provided with the reference sign 56 (temperature), 58 (pressure), 60 (operation time) and 62 (number of switching cycles and frequency of actuations).

Certain properties may also be determined at any point during operation of the diaphragm valve 10 in a different manner. For example, it is possible for the current thickness of the diaphragm 14 to be determined at the time of an initialization of the valve drive 20. This can be done, for example, by slowly closing the valve drive 20 as far as is sufficient for the diaphragm 14 to come into contact with a valve seat of the valve body 12, and by recording the corresponding path of the valve drive 20. The determined current diaphragm thickness may then also be saved manually or automatically in the data memory 24, for example.

It is also possible for an operator to determine the current state of the diaphragm 14 during maintenance of the diaphragm valve 10, for example during a visual inspection. To do this, the operator may, for example, have at their disposal a catalogue of possible standardized visual appearances on the diaphragm 10, such that the operator can compare the appearance of the diaphragm 14 at the time with the standardized visual appearances shown and thereby deduce that the diaphragm 14 in question corresponds most closely to a particular standardized appearance. A code number corresponding to the appearance can then, for example, be transmitted to the data memory 24 for storage via the reading device 36.

The transmission device 38 may, as shown in FIG. 2, be a bidirectional transmission device which can thus transmit data or information both from the reading device 36 to the processing device 40 (arrow 64) and from the processing device 40 to the reading device 36 (arrow 66). In principle, however, it is also conceivable for the transmission device 38 to function in a solely unidirectional manner, for example to transmit data only in the direction of the arrow 64 from the reading device 36 to the processing device 40.

Based on the entirety of the available data, i.e. the data read out from the integrated data memory 24 and transmitted and the data synchronized therewith present in the processing device 40, said entirety of available data can then be processed in the processing device 40 and, depending on the result of this processing, an action is then determined. For example, the processing may involve determining the current state of wear of the diaphragm 14.

Depending on such a current state of wear, status information can then be automatically generated as the action and transmitted to the reading device 36 via the transmission device 38 and displayed on the display 48 of said reading device. Depending on the current state of wear and further relevant data, a probable remaining service life can also be determined using a corresponding algorithm. If said determined remaining service life is below a threshold value, valve failure is imminent, and corresponding warning information can be generated and likewise transmitted to the reading device 36 by means of the transmission device 38 and displayed on the display 48 of said reading device. Additionally, in such a case as this, an acoustic signal may also be generated at the reading device 36, which signal indicates to the operator the urgency of a measure.

Depending on such a current state of wear, a maintenance request may also be generated in the action module 54, and in the action module 52, the corresponding replacement part, for example a new diaphragm 14, may be requested immediately.

While data relating to the diaphragm 14 are primarily stored in the RFID chip 24 of the diaphragm 14, data relating to the valve body 12 are rather stored in the RFID chip 30 of the valve body 12. In principle, every essential individual component of the diaphragm valve 10 may be provided with a data memory, for example in the form of an RFID chip, in which the data relating to this specific component are then stored. However, it is also conceivable for the data memory 30 provided on the outlet port 28 of the valve body 12 to store all data relating to components that are not the diaphragm 14.

Finally, it is essential that the individual data be synchronized on an external apparatus, specifically the processing device 40, as a result of which an electronic identity for the diaphragm valve 10 is produced, which may for example be as follows:

Diaphragm valve A=diaphragm B+ valve drive C+ valve body D at timepoint E, assembled on F by G, the diaphragm B having been produced on H by I, etc.

Because the diaphragm 14 is provided with a data memory 24, reliability can be significantly improved during maintenance. Specifically, it can be identified, for example, whether the correct diaphragm 14 has been installed in the diaphragm valve 10 during replacement of the diaphragm 14, or whether, for example, the old and worn diaphragm 14 has been inadvertently re-installed in the diaphragm valve 10. The data memory 24 of the diaphragm 14, together with the other linked or synchronized data, also provides the means for counterfeit protection. This is in particular possible if the data in the data memory 24 of the diaphragm 14 are correspondingly encrypted and/or an individual and unfalsifiable identification code for each individual diaphragm 14 is stored.

By means of the synchronized data, a complete electronic service life record for the diaphragm valve 10 is produced, which record can be used in the context of quality assurance of the operation of the process installation 32 and can be retrieved extremely quickly in order to reduce the liability risks for the operator of the process installation 32. If necessary, it is also possible, using the example of a diaphragm 14, to trace back to the manufacture thereof, to the resources used for manufacture, etc.

Figure 3:
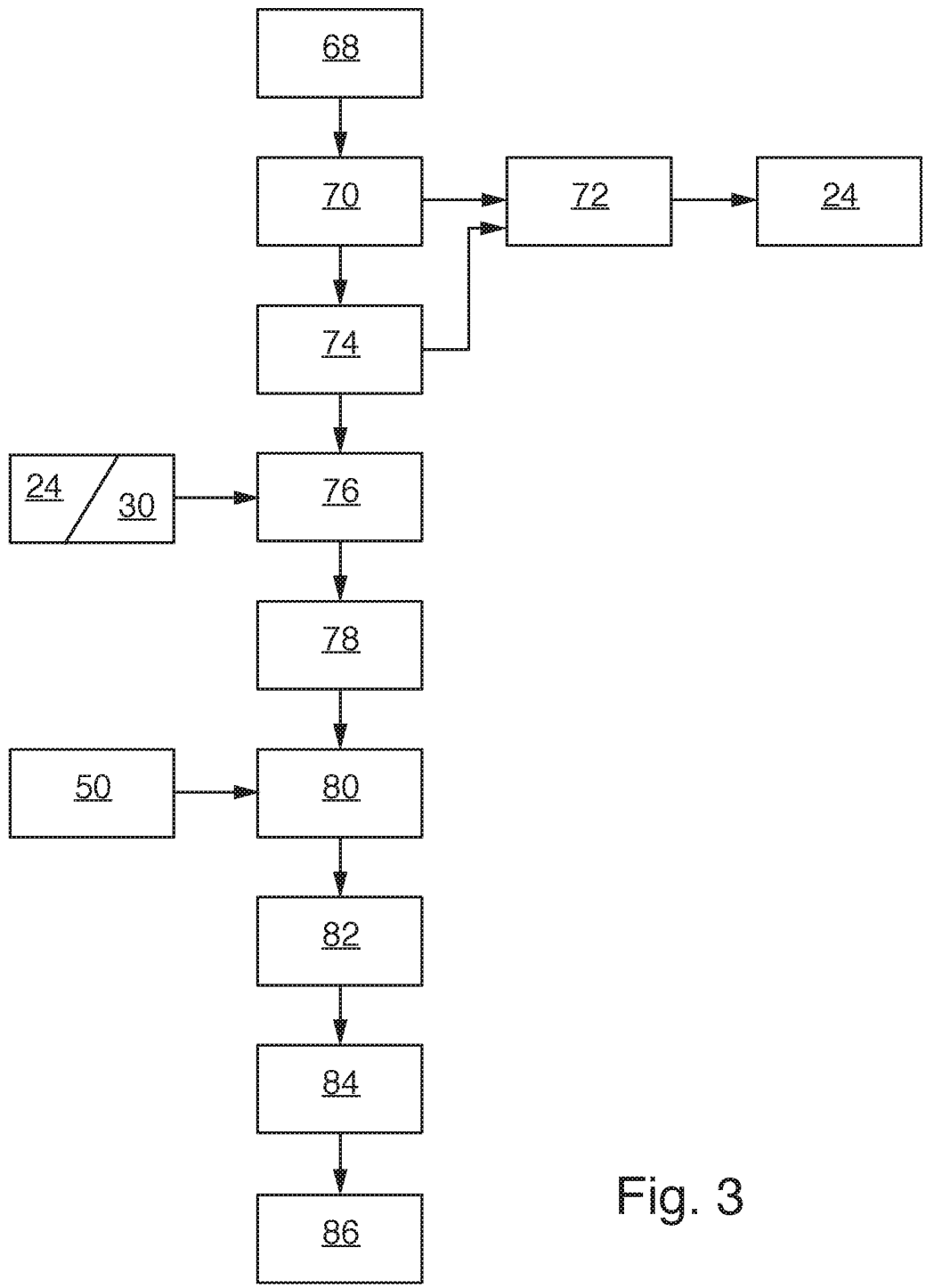
FIG. 3 is a flow diagram of a method for operating the diaphragm valve from FIG. 1.

A method for operating the diaphragm valve 10 will now be described with reference to FIG. 3: after starting box 68, in box 70 the current thickness of the diaphragm 14 is determined at the time of an initialization of the valve drive 20, and in box 72 said thickness is saved in the data memory 24 together with the time said thickness was determined. In box 74, the state of the diaphragm 14 is assessed by means of a visual inspection during maintenance and stored as a corresponding code in the data memory 24 as well.

In box 76, the data stored in the data memories 24 and 30 are read out. In 78, the read-out data are wirelessly transmitted to the processing device 40 by means of the transmission device 38. In box 80, the transmitted data are synchronized with the data read out from the data memory 50 and the synchronized data are processed. Depending on the result of the processing in box 80, actions are determined in box 82, and in box 84 the determined actions are carried out. The method ends in 86.

What is claimed is:

1. Method for operating a diaphragm valve, which comprises the step of reading out data, from at least one data memory integrated into the diaphragm valve, by means of a reading device, characterized in that the method further comprises the steps of:
    a. transmitting the read-out data to a processing device which is arranged remote from the reading device and the diaphragm valve;
    b. providing access to data present in the processing device that is characterized by at least one of: at least one property of the diaphragm of the diaphragm valve; at least one property of a component of the diaphragm valve that is not the diaphragm; and at least one property of the diaphragm valve; and
    c. synchronizing the transmitted data with data present in the processing device.

2. Method according to claim 1, characterized in that in step a, the data are transmitted to a processing device which is at the premises of the manufacturer or supplier of the diaphragm valve.

3. Method according to claim 1, characterized in that the data are read out by means of a mobile reading device, in particular by means of at least one of a smartphone, tablet PC and smart tablet.

4. Method according to claim 1, characterized in that the data are read out wirelessly.

5. Method according to claim 1, characterized in that the data present in the processing device characterize at least one property of the diaphragm of the diaphragm valve and at least one property of a component of the diaphragm valve that is not the diaphragm, and at least one property of the diaphragm valve.

6. Method according to claim 1, characterized in that data which characterize at least one property of a component that is not the diaphragm and one operational property of the diaphragm valve are read out from the integrated data memory.

7. Method according to claim 5, characterized in that the data which characterize at least one property of the diaphragm of the diaphragm valve and at least one property of the component of the diaphragm valve that is not the diaphragm and-at least one property of the diaphragm valve at least one item of data from the following group: type, material, valve drive, manufacture date, manufacture location, production batch, quality test values, supplier, delivery route, storage location, storage duration, date into storage, date out of storage, installation date, installation location, name of installer, name of operator.

8. Method according to claim 6, characterized in that the data which characterize an operational property of the diaphragm valve comprise an item of data from the following group: fluid type, fluid pressure, fluid temperature, number of switching cycles, operating time.

9. Method according to claim 1, characterized in that, at the time of an initialization of a valve drive, the current diaphragm thickness is determined and, together with the date said thickness was determined, stored in the data memory and transmitted to the processing device.

10. Method according to claim 1, characterized in that, during maintenance of the diaphragm valve, at least one variable which characterizes the current state of the diaphragm is determined and stored in the data memory and transmitted to the processing device.

11. Method according to claim 1, characterized in that it further comprises the following steps:
   c. processing the synchronized data in the processing device;
   d. determining an action by means of the processing device depending on the result of the processing.

12. Method according to claim 11, characterized in that in step c, the processing device determines a probable state of wear, in particular of the diaphragm.

13. Method according to claim 11, characterized in that the action in step d comprises at least one action from the following group: automatic creation and/or transmission of status information, automatic creation and/or transmission of a replacement part request, automatic creation and/or transmission of warning information.

14. Method according to claim 13, characterized in that at least one of the status information and warning information is transmitted to the reading device and displayed thereon.

15. Method according to claim 13, characterized in that the status information comprises at least one of a probable remaining service life and the warning information comprises an indication of imminent valve failure.

16. System which comprises: a diaphragm valve comprising at least one data memory integrated into the diaphragm valve; a reading device for reading out data stored in the data memory; a transmission device for transmitting the read-out data to a processing device which is arranged remote from the reading device and the diaphragm valve; wherein the data memory, the reading device, the transmission device and the processing device are designed and programmed to carry out a method comprising the steps of
   a. means for transmitting the read-out data to a processing device which is arranged remote from the reading device and the diaphragm valve;
   b. means for providing access to data present in the processing device that is characterized by at least one of: at least one property of the diaphragm of the diaphragm valve; at least one property of a component of the diaphragm valve that is not the diaphragm; and at least one property of the diaphragm valve; and
   c. means for synchronizing the transmitted data with data present in the processing device.

17. Reading device for reading out data stored in a data memory, characterized in that said reading device is designed and programmed to carry out a method comprising the steps of:
   a. means for transmitting the read-out data to a processing device which is arranged remote from the reading device and the diaphragm valve;
   b. means for providing access to data present in the processing device that is characterized by at least one of: at least one property of the diaphragm of the diaphragm valve; at least one property of a component of the diaphragm valve that is not the diaphragm; and at least one property of the diaphragm valve; and
   c. means for synchronizing the transmitted data with data present in the processing device.

* * * * *